(12) United States Patent
Gorti et al.

(10) Patent No.: US 12,444,194 B2
(45) Date of Patent: Oct. 14, 2025

(54) TEXT-CONDITIONED VIDEO REPRESENTATION

(71) Applicant: THE TORONTO-DOMINION BANK, Toronto (CA)

(72) Inventors: Satya Krishna Gorti, Toronto (CA); Junwei Ma, Toronto (CA); Guangwei Yu, Toronto (CA); Maksims Volkovs, Toronto (CA); Keyvan Golestan Irani, Toronto (CA); Noël Vouitsis, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 500 days.

(21) Appl. No.: 17/894,738

(22) Filed: Aug. 24, 2022

(65) Prior Publication Data

US 2023/0351753 A1 Nov. 2, 2023

Related U.S. Application Data

(60) Provisional application No. 63/336,116, filed on Apr. 28, 2022.

(51) Int. Cl.
*G06V 20/40* (2022.01)

(52) U.S. Cl.
CPC .............. *G06V 20/47* (2022.01); *G06V 20/41* (2022.01)

(58) Field of Classification Search
CPC ............................ G06V 20/47; G06V 20/41
See application file for complete search history.

(56) References Cited

U.S. PATENT DOCUMENTS

| 9,367,763 | B1 | 6/2016 | Soldevila et al. |
| 11,582,485 | B1* | 2/2023 | Cherian ................. G06V 10/86 |
| 11,995,394 | B1* | 5/2024 | Morariu ................. G06N 3/045 |
| 2008/0215561 | A1 | 9/2008 | Yu et al. |
| 2009/0292685 | A1 | 11/2009 | Liu et al. |
| 2015/0339380 | A1 | 11/2015 | Zhang et al. |

(Continued)

OTHER PUBLICATIONS

Pan, Yingwei, et al. "Jointly modeling embedding and translation to bridge video and language." Proceedings of the IEEE conference on computer vision and pattern recognition. 2016. (Year: 2016).*

(Continued)

*Primary Examiner* — Andrae S Allison
(74) *Attorney, Agent, or Firm* — Patent Capital Group (57) ABSTRACT

A text-video recommendation model determines relevance of a text to a video in a text-video pair (e.g., as a relevance score) with a text embedding and a text-conditioned video embedding. The text-conditioned video embedding is a representation of the video used for evaluating the relevance of the video to the text, where the representation itself is a function of the text it is evaluated for. As such, the input text may be used to weigh or attend to different frames of the video in determining the text-conditioned video embedding. The representation of the video may thus differ for different input texts for comparison. The text-conditioned video embedding may be determined in various ways, such as with a set of the most-similar frames to the input text (the top-k frames) or may be based on an attention function based on query, key, and value projections.

20 Claims, 6 Drawing Sheets

(56) References Cited

U.S. PATENT DOCUMENTS

| | | | |
|---|---|---|---|
| 2017/0357720 A1* | 12/2017 | Torabi | G06F 16/7844 |
| 2021/0109966 A1* | 4/2021 | Ayush | G06N 3/044 |
| 2021/0266650 A1 | 8/2021 | Beck et al. | |
| 2023/0116680 A1* | 4/2023 | Sakhinana | G06N 3/063 706/21 |
| 2023/0140369 A1* | 5/2023 | Aminian | G06F 16/739 382/103 |
| 2023/0154188 A1* | 5/2023 | Li | G06V 20/41 382/159 |
| 2024/0346082 A1* | 10/2024 | Kumar | G06F 16/90332 |
| 2024/0404283 A1* | 12/2024 | Wang | G06V 10/776 |

OTHER PUBLICATIONS

B. Satar, Z. Hongyuan, X. Bresson and J. H. Lim, "Semantic Role Aware Correlation Transformer for Text to Video Retrieval," 2021 IEEE International Conference on Image Processing (ICIP), Anchorage, AK, USA, 2021, pp. 1334-1338, doi: 10.1109/ICIP42928.2021. 9506267. (Year: 2021).*

Du, Wanru, et al. "A cross-modal conditional mechanism based on attention for text-video retrieval." Mathematical Biosciences and Engineering 20.11 (2023): 20073-20092. (Year: 2023).*

Zhang et al alignment-attention-by-matching-key-and-query-distributions-Paper, 35th Conference on Neural Information Processing Systems (NeurIPS 2021). (Year: 2021).*

Ali, et al., "Video and Text Matching with Conditioned Embeddings," Proceedings of WACV 2022, CVPR, Oct. 21, 2021, 10 pages; https://arxiv.org/pdf/2110.11298.pdf.

International Search Report and Written Opinion issued in PCT/CA2022/051279 on Jan. 16, 2023; 8 pages.

Alayrac, et al., "Self-Supervised MultiModal Versatile Networks," 34th Conference on Neural Information Processing Systems (NeurIPS 2020), 2(6):7, arXiv:2006.16228v2, Oct. 30, 2020, 19 pages; https://arxiv.org/pdf/2006.16228.pdf.

Amrani, et al., "Noise Estimation Using Density Estimation for Self-Supervised Multimodal Learning," arXiv:2003.03186v3, Dec. 10, 2020, 15 pages; https://arxiv.org/pdf/2003.03186.pdf.

Antol, et al., "VQA: Visual Question Answering," IEEE International Conference on Computer Vision, arXiv preprint arXiv:1505. 00468v7, Oct. 27, 2016, 25 pages; https://arxiv.org/pdf/1505.00468. pdf.

Ba, et al., "Layer Normalization," arXiv preprint arXiv:1607. 06450v1, Jul. 21, 2016, 14 pages; https://arxiv.org/pdf/1607.06450_ pdf.

Bain, et al., "Frozen in time: A Joint Video and Image Encoder for End-to-End Retrieval," arXiv preprint arXiv:2104.00650v1, Apr. 1, 2021, 14 pages; https://arxiv.org/pdf/2104.00650v1.pdf.

Baltrusaitis, et al., "Multimodal Machine Learning: A Survey and Taxonomy," IEEE Transactions on Pattern Analysis and Machine Intelligence, arXiv:1705.09406, Aug. 1, 2017, 20 pages; https://people.ict.usc.edu/~gratch/CSCI534/Readings/Baltrusaitis-MMML-survey.pdf.

Carreira, et al., "Quo Vadis, Action Recognition? A New Model and the Kinetics Dataset," IEEE Conference on Computer Vision and Pattern Recognition, arXiv:1705.07750v2, Jul. 20, 2017, 10 pages; https://arxiv.org/pdf/1705.07750v2.pdf.

Chen, et al., "Collecting Highly Parallel Data for Paraphrase Evaluation," 49th Annual Meeting of the Association for Computational Linguistics, Jun. 2011, 11 pages; https://aclanthology.org/P11-1020. pdf.

Chen, et al., "Uniter: Universal Image-Text Representation Learning," European Conference on Computer Vision, DOI: 10.1007/978-3-030-58577-8_7 Springer 2020; 17 pages; https://www.ecva.net/papers/eccv_2020/papers_ECCV/papers/123750103.pdf.

Croitoru, et al., "TeachText: CrossModal Generalized Distillation for Text-Video Retrieval," IEEE/CVF International Conference on Computer Vision, 2021, 11 pages; https://openaccess.thecvf.com/content/ICCV2021/papers/Croitoru_TeachText_CrossModal_Generalized_Distillation_for_Text-Video_Retrieval_ICCV_2021_paper.pdf.

Dzabraev, et al., "MDMMT: Multidomain Multimodal Transformer for Video Retrieval," IEEE/CVF Conference on Computer Vision and Pattern Recognition, arXiv:2103.10699v1, Mar. 19, 2021, 18 pages; https://arxiv.org/pdf/2103.10699.pdf.

Gabeur, et al., "Multi-modal Transformer for Video Retrieval," in Computer Vision-ECCV 2020: 16th European Conference, Glasgow, UK, arXiv:2007.10639v1, Jul. 21, 2020, 18 pages; https://arxiv.org/pdf/2007.10639.pdf.

Jia, et al., "Scaling up Visual and Vision-Language Representation Learning with Noisy Text Supervision," arXiv preprint arXiv:2012. 05918, Jun. 11, 2021, 14 pages; https://arxiv.org/pdf/2102.05918. pdf.

Karpathy, et al., "Deep Visual-Semantic Alignments for Generating Image Descriptions," IEEE Conference on Computer Vision and Pattern Recognition, arXiv:1412.2306v2, Apr. 14, 2015, 17 pages; https://arxiv.org/pdf/1412.2306v2.pdf.

Lei, et al., "Less is More: ClipBERT for Video-and-Language Learning via Sparse Sampling," IEEE/CVF Conference on Computer Vision and Pattern Recognition, arXiv:2102.06183, Feb. 11, 2021, 12 pages; https://arxiv.org/pdf/2102.06183.pdf.

Li, et al., "Align before Fuse: Vision and Language Representation Learning with Momentum Distillation," 35th Annual Conference on Neural Information Processing Systems, arXiv:2107.07651v1, Jul. 16, 2021, 16 pages; https://arxiv.org/pdf/2107.07651v1.pdf.

Li, et al., "Oscar: Object-Semantics Aligned Pre-Training for Vision-Language Tasks," European Conference on Computer Vision, arXiv:2004.06165v5, Jul. 26, 2020, 21 pages; https://arxiv.org/pdf/2004.06165.pdf.

Li, et al., "Quality Assessment of In-the-Wild Videos," 27th ACM International Conference on Multimedia, arXiv:1908.00375v3, Oct. 5, 2019, 9 pages; https://arxiv.org/abs/1908.00375.

Li, et al., "Supervision Exists Everywhere: A Data-Efficient Contrastive Language-Image Pre-Training Paradigm," arXiv preprint arXiv:2110.05208v2, Mar. 14, 2022, 17 pages; https://arxiv.org/pdf/2110.05208v2.pdf.

Li, et al., "VisualBERT: A Simple and Performant Baseline for Vision and Language," arXiv preprint arXiv:1908.03557, Aug. 9, 2019, 14 pages; https://arxiv.org/pdf/1908.03557.pdf.

Liu, et al., "Recognizing Realistic Actions From Videos in the Wild," IEEE Conference on Computer Vision and Pattern Recognition, 9 pages, Jul. 2009; https://www.semanticscholar.org/paper/Recognizing-realistic-actions-from-videos-%E2%80%9Cin-the-Liu-Luo/aca29d7bbbf54078f842c8ca1d75d8d8c68191d2.

Liu, et al., "Use What You Have: Video Retrieval Using Representations from Collaborative Experts," arXiv preprint arXiv:1907. 13487, Feb. 14, 2020, 19 pages; https://arxiv.org/pdf/1907.13487. pdf.

Loshchilov, et al., "Decoupled Weight Decay Regularization," arXiv preprint arXiv:1711.05101, Nov. 17, 2017, 19 pages; https://arxiv.org/pdf/1711.05101.pdf.

Loshchilov, et al., "SGDR: Stochastic Gradient Descent with Warm Restarts," arXiv preprint arXiv:1608.03983, Aug. 13, 2016, 16 pages; https://arxiv.org/pdf/1608.03983.pdf.

Lu, et al., "ViLBERT: Pretraining Task-Agnostic Visiolinguistic Representations for Vision-and-Language Tasks," arXiv preprint arXiv:1908.02265, Aug. 6, 2019, 11 pages; https://arxiv.org/pdf/1908.02265.pdf.

Luo, et al., "CLIP4Clip: An Empirical Study of CLIP for End to End Video Clip Retrieval," arXiv preprint arXiv:2104.08860, May 8, 2021, 14 pages; https://arxiv.org/pdf/2104.08860.pdf.

Miech, et al., "End-to-End Learning of Visual Representations from Uncurated Instructional Videos," IEEE/CVF Conference on Computer Vision and Pattern Recognition, arXiv:1912.06430, Aug. 23, 2020, 14 pages; https://arxiv.org/pdf/1912.06430.pdf.

Miech, et al., "HowTo100M: Learning a Text-Video Embedding by Watching Hundred Million Narrated Video Clips," IEEE/CVF International Conference on Computer Vision, 2019, 11 pages, https://openaccess.thecvf.com/content_ICCV_2019/papers/Miech_HowTo100M_Learning_a_Text-Video_Embedding_by_Watching_Hundred_Million_Narrated_ICCV_2019_paper.pdf.

(56) References Cited

OTHER PUBLICATIONS

Miech, et al., "Learning a Text-Video Embedding From Incomplete and Heterogeneous Data," arXiv preprint arXiv:1804.02516, Jan. 16, 2020, 16 pages; https://arxiv.org/pdf/1804.02516.pdf.

Miech, et al., "Thinking Fast and Slow: Efficient Text-to-Visual Retrieval with Transformers," IEEE/CVF Conference on Computer Vision and Pattern Recognition, arXiv:2103.16553, Mar. 30, 2021, 16 pages; https://arxiv.org/pdf/2103.16553.pdf.

Patrick, et al., "Support-Set Bottlenecks for Video-Text Representation Learning," arXiv preprint arXiv:2010.02824, Jan. 14, 2021, 18 pages; https://arxiv.org/pdf/2010.02824.pdf.

Portillo-Quintero, et al., "A Straightforward Framework for Video Retrieval using CLIP," in Mexican Conference on Pattern Recognition, arXiv:2102.12443, Feb. 26, 2021, 10 pages; https://arxiv.org/pdf/2102.12443.pdf.

Radford, et al., "Learning Transferable Visual Models from Natural Language Supervision," arXiv preprint arXiv:2103.00020, Feb. 26, 2021, 48 pages; https://arxiv.org/pdf/2103.00020.pdf.

Rohrbach, et al., "Movie Description," International Journal of Computer Vision, 123(1):94-120, 2017, arXiv:1605.03705, May 12, 2016, 25 pages; https://arxiv.org/pdf/1605.03705.pdf.

Soomro, et al., "UCF 101: A Dataset of 101 Human Actions Classes From Videos in the Wild," arXiv Preprint arXiv:1212.0402, Dec. 3, 2012, 7 pages; https://arxiv.org/abs/1212.0402.

Srivastava, et al., "Dropout: A Simple Way to Prevent Neural Networks from Overfitting," The Journal of Machine Learning Research, 2014, 30 pages; https://jmlr.org/papers/volume15/srivastava14a/srivastava14a.pdf.

Tan, et al., "Look at What I'm Doing: Self-Supervised Spatial Grounding of Narrations in Instructional Videos," 35th Conference on Neural Information Processing Systems (NeurIPS 2021) May 21, 2021, 12 pages; https://proceedings.neurips.cc/paper/2021/file/792dd774336314c3c27a04bb260cf2cf-Paper.pdf.

Tan, et al., "LXMERT: Learning Cross-Modality Encoder Representations from Transformers," arXiv preprint arXiv:1908.07490, Dec. 3, 2019, 14 pages; https://arxiv.org/pdf/1908.07490.pdf.

Vaswani, et al., "Attention is All You Need," in Advances in Neural Information Processing Systems, arXiv:1706.03762, Dec. 6, 2017, 15 pages; https://arxiv.org/pdf/1706.03762.pdf.

Xu, et al., "MSR-VTT: A Large Video Description Dataset for Bridging Video and Language," IEEE Conference on Computer Vision and Pattern Recognition, DOI: 10.1109/CVPR.2016.571, 2016, 9 pages; https://www.microsoft.com/en-us/research/wp-content/uploads/2016/06/cvpr16.msr-vtt.tmei_-1.pdf.

Xu, et al., "Show, Attend and Tell: Neural Image Caption Generation with Visual Attention," 32nd International Conference on Machine Learning, Lille, France, 2015, JMLR: W&CP vol. 37, 10 pages; http://proceedings.mlr.press/v37/xuc15.pdf.

Yao, et al., "Describing Videos by Exploiting Temporal Structure," IEEE International Conference on Computer Vision, arXiv:1502.08029, Oct. 1, 2015, 23 pages; https://arxiv.org/pdf/1502.08029.pdf.

Yu, et al., "A Joint Sequence Fusion Model for Video Question Answering and Retrieval," European Conference on Computer Vision (ECCV), arXiv:1808.02559, Aug. 7, 2018, 17 pages; https://arxiv.org/pdf/1808.02559.pdf.

Zhai, et al., "Classification is a Strong Baseline for Deep Metric Learning," arXiv preprint arXiv:1811.12649, Aug. 4, 2019, 12 pages; https://arxiv.org/pdf/1811.12649.pdf.

Zhang, et al., "Temporal Query Networks for Fine-Grained Video Understanding," IEEE/CVF Conference on Computer Vision and Pattern Recognition, pp. 4486-4496, 2021, arXiv:2104.09496, Apr. 19, 2021, 11 pages; https://openaccess.thecvf.com/content/CVPR2021/papers/Zhang_Temporal_Query_Networks_for_Fine-Grained_Video_Understanding_CVPR_2021_paper.pdf.

Zhu, Yang., "ActBERT: Learning Global-Local Video-Text Representations," IEEE/CVF Conference on Computer Vision and Pattern Recognition, 2020, arXiv:2011.07231, Nov. 14, 2020, 10 pages; https://openaccess.thecvf.com/content_CVPR_2020/papers/Zhu_ActBERT_Learning_Global-Local_Video-Text_Representations_CVPR_2020_paper.pdf.

* cited by examiner

TEXT-CONDITIONED VIDEO REPRESENTATION

CROSS-REFERENCE TO RELATED APPLICATION

This application claims the benefit of U.S. Provisional Application No. 63/336,116, filed Apr. 28, 2022, the contents of which are hereby incorporated by reference in its entirety.

BACKGROUND

This disclosure relates generally to identifying relevancy between text and videos and more particularly to determining relevancy between text and a video by determining a text-dependent (i.e., text-conditioned) representation of the video.

In general, to identify relevancy between text (e.g., a text string) and a video (e.g., a sequence of frames), text or video may be used as an input to identify the relevancy of the other. For example, an input text string may be used for a search query to identify relevant videos, or a video may be input to identify a relevant text string (e.g., from a set of possible text strings) describing the video. As such, generally a large corpus of videos and associated text strings may be used for training a model that identifies a relevance or similarity score between text and video.

More formally, an objective for text-video prediction is generally to learn a similarity function (e.g., a relevance score) between a text and a video that ranks relevant text-video pairs higher than irrelevant pairs (e.g., based on the relevance score output from the similarity function). One problem is that videos inherently express a much wider range of information than texts, as individual frames may vary considerably within a single video, and different portions of the video may include different scenes that may include transitions of different types between them. Even in a single scene (e.g., a continuous sequence of images without any cuts), a video may include significantly different content over a small amount of time. As such, texts are often most relevant to portions or subregions of an entire video and are thus most semantically similar to certain frames within a video. However, existing work does not focus on the most semantically similar video sub-regions to make a more relevant comparison. Rather, most existing works aggregate frame representations across an entire video without considering the text for evaluation and do not provide a means for effectively considering the relationship of text to individual portions of a video.

SUMMARY

To improve video-text retrieval, when evaluating a video for relevance to a particular input text, the video is characterized in a representation (e.g., as an embedding) as a function of (i.e., conditioned on) the particular text for which relevance is evaluated. As such, the text affects the representation of the video as used to determine a similarity score so that the same video may be characterized by different representations when evaluated with respect to different texts, as the different texts are used to identify relevant portions of the video with respect to the respective texts. To do so, the text is used to affect the contribution of portions of the video (e.g., individual frames) to a representation of the video. The contribution of portions of the video may also be considered a type of attention mechanism, such that the attention to information from different frames is affected by the input text, focusing the representation of the video on the portions/frames most relevant to the input text. In one embodiment, the relevance score for a text-video pair is determined by cosine similarity of a text embedding and a video embedding in a joint latent space. The video embedding (as input to the relevance score) is generated as a function of the text, such that different text inputs yield different video embeddings as the different texts provide for different contributions of individual frames in the video. For a text-video pair, the text-conditioned video representation (e.g., the representation of the video focusing on the aspects relevant to that particular text) may then be evaluated in conjunction with a text representation to determine the relevance score for that text-video pair.

In one embodiment, for a given text-video pair, the input text is processed to generate a text embedding and the video is processed to generate a text-conditioned video embedding. Frames of the video may be processed to determine a set of frame embeddings for each of the frames of the video, and the text is used to determine the respective contribution of the frame embeddings in generating the text-conditioned video embedding. The text-conditioned video embedding may then be applied to the text embedding (e.g., with cosine similarity) to determine a relevance score of the text-video pair. This permits the representation of the video to account for the specific text, allowing the video representation to attend to different frames according to the text in determining the overall video embedding.

The text may be used to condition the video representation in several ways. The text may be used to determine a weight of the frames of the video in the respective contribution of the frames to generating the video embedding. In additional embodiments, the frame contributions to the video embedding are determined by evaluating the relevance of video frames to the text and selecting a number of frames (e.g., top-k) that are most similar to the text. As another example, the text and video frame representations (e.g., embeddings) may be projected to query, key, and value matrices, such that the text is projected to a query dimension used in combination with a key projected from the video frames to determine the contribution (e.g., weight(s)) of a value associated with each frame. The resulting values may then be re-projected to the dimensionality of the text embedding to generate the text-conditioned video embedding that may be evaluated with the text embedding.

As such, the text-conditioned video representation allows for joint reasoning between a text and a video's frames. Rather than pool (e.g., average) all frames of a video to create the video embedding irrespective of the input text, this approach provides flexibility for a video representation to attend to its most semantically similar frames for a given text, and then generates an aggregated video representation conditioned on those frames that may be evaluated for a recommendation score with respect to the text.

As a result, this approach allows a model to use representations of constituent frames of a video in determining the video's representation and provide a way to use the most relevant video frames in relation to a given text, which outperforms baselines that use text-agnostic frame pooling for video representations. This approach obtains improved results across popular benchmark datasets and performs well on videos having several different scenes and scene transitions.

DETAILED DESCRIPTION

Architecture Overview

Figure 1:
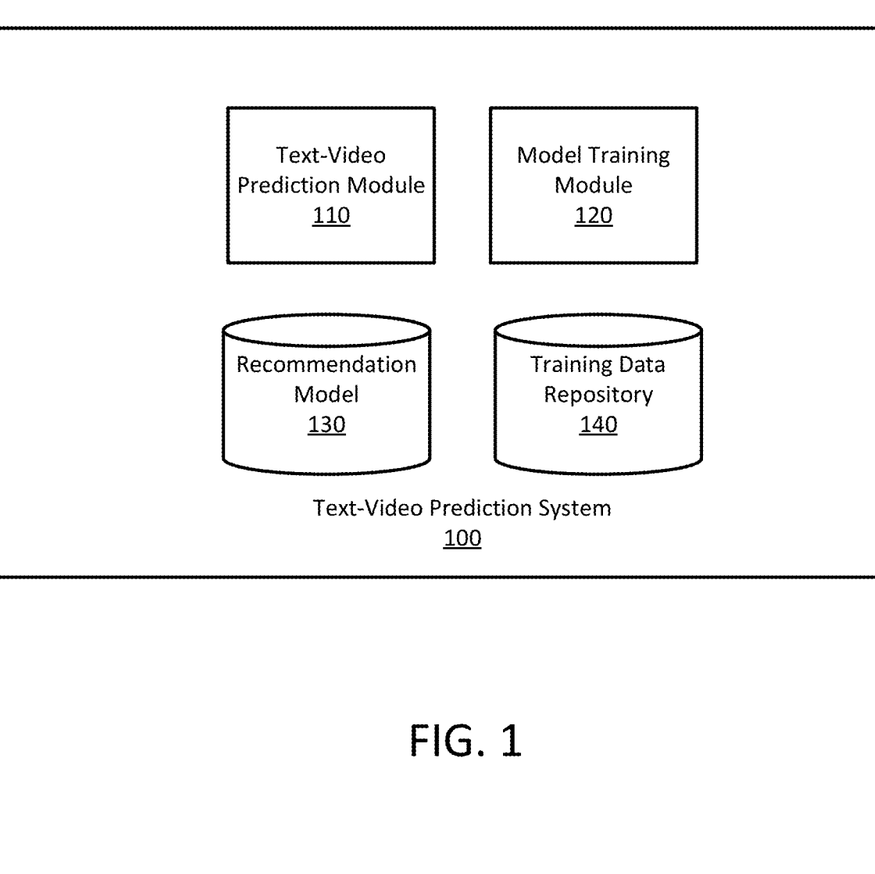
FIG. 1 illustrates an example architecture for a text-video prediction system text-video recommendation, according to one embodiment.

FIG. 1 illustrates an example architecture for a text-video prediction system 100 text-video recommendation, according to one embodiment. The text-video prediction system 100 uses a recommendation model 130 for evaluating the relevance of text-video pairs. The text-video prediction system 100 may include a text-video prediction module 110 that receives a query and provides one or more results to the query based on the recommendation model 130 trained by a model training module 120. The text-video prediction system 100 may be in communication with additional systems and devices via various types of communication channels, such as various networking channels and are generally omitted herein for clarity of description. Similarly, the text-video prediction system 100 may be a portion of a larger query response or other type of system that processes text or video and may thus include or be associated with additional features and functionality. In addition to queries, the text-video prediction system 100 may also be used for automated video labeling or classification, tagging, or other text-video related tasks. In general, the text-video prediction system 100 evaluates relevance of a text (e.g., a text string) with respect to a video. A "text" is generally a text string including characters arranged in one or more words that may be represented as one or more terms or text tokens. A video generally includes two or more frames of individual images. Each video may include hundreds, thousands, or more individual frames, each of which may depict different objects, scenes, or other content.

The recommendation model 130 generates a text-video relevance score based on an input text and video by applying a text-conditioned video embedding to a text embedding as further discussed below. The text-video prediction module 110 coordinates the application of the recommendation model 130 to text-video pairs. The particular application of the text-video prediction module 110 may vary in different embodiments. In one embodiment, the text-video prediction module 110 may generate text-video pairs for application of the recommendation model 130 that may then be ranked to identify the most relevant text-video pair (e.g., the text-video pair having the highest relevance score). The recommendation model 130 may be thus configured (and trained) to be effective both for video-to-text and text-to-video retrieval. For example, to query based on text, an input text may be provided, and text-video pairs may be generated for the input text and each of a set of candidate videos, such that the input text is constant for the text-video pairs. The text-video pairs may then be provided to the recommendation model 130 to generate respective relevance scores for each of the input text-video pairs, which may be ranked. Responses to the query may be selected based on the ranking, for example to provide the highest-ranking video or the top N ranked videos of the text-video pairs. Similarly, an input video may be provided and a set of text-video pairs may be generated with a set of candidate texts for the video.

As such, the text-video prediction module in one embodiment may receive queries (e.g., from a client device or other system requesting a relevant text or video) by constructing corresponding text-video pairs to be scored by the recommendation model 130 and provide query results based on the scores. As one implementation, the text-video prediction module thus performs either a text- or video-based search for relevant video or text. The text-video relevance scoring may be used for additional uses, such as by inputting a new video and identifying the most likely text (from a set of candidate texts) with which to label the video. The set of candidate texts may also be adjusted (e.g., from a complete set of all texts during training) to identify related text based on a particular subset of texts. For example, a set of candidate texts (which may be a subset of all texts) may be associated with one or more classifications or tags, and the relevance scores of text-video pairs for the texts may be used to evaluate which classification/tag, if any, may describe the video, enabling the model to be used to automatically label and classify videos in addition to retrieval tasks. The text-video prediction module 110 may thus coordinate generation of text-video pairs for scoring by the recommendation model 130 based on an input text or video and corresponding sets of candidate texts or videos for evaluation. The text-video prediction module 110 may also perform ranking and processing of the resulting scores, or may provide such scoring or results to subsequent processes, systems, or devices according to various configurations.

The recommendation model 130 has various parameters that may be applied for evaluating a text-video pair to determine a relevance score. Generally, the parameters may be used for determining a text embedding and a text-conditioned video embedding in a joint latent space, such that the text embedding and video embedding may be used to determine the relevance score for the respective text and video in the text-video pair. The parameters of the model are trained by the model training module 120 based on a set of training data that may be stored in a training data repository 140. The training data repository 140 includes a training set of videos and texts associated with (i.e., labeling) the set of videos. The associated text for each video may indicate the text to be considered the "correct" text for the video for the model to learn, while other texts not associated with the video may be considered incorrect. Thus, the text-video score is trained by the model training module 120 to learn parameters that yield higher relevance scores for text-video pairs corresponding to labels of texts and associated videos in the training data, and yield lower relevance scores for text-video pairs corresponding to texts that are not labels of the videos in the training data.

In one embodiment, the training data repository 140 includes a set of texts and videos that may be used for training the recommendation model 130. In one embodiment, the training data may include specific texts comprising relatively specific descriptions of videos, such as "News program describing train accident near highway" or "boy plays with a cat using a ball." In some embodiments, one label is used for each video, and in additional embodiments, a plurality of labels are associated with each video. Similarly, each text may be unique to the associated video, and in other embodiments, a given text may be associated with multiple videos.

Figure 2A:
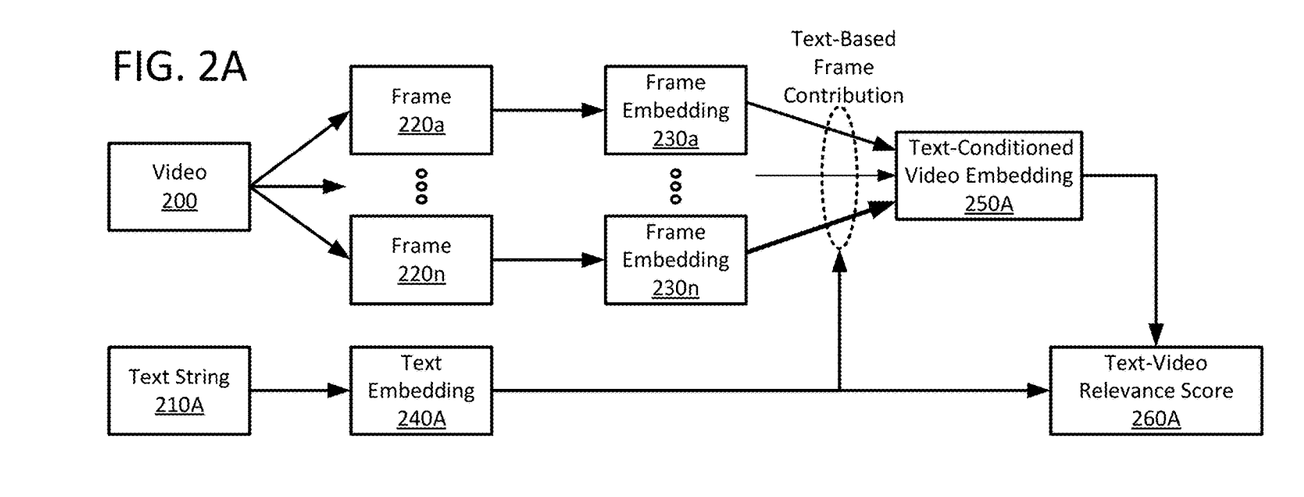
FIGS. 2A-B shows example flows for evaluating a text-video pair to determine a text-video relevance score, according to one embodiment.
Figure 2B:
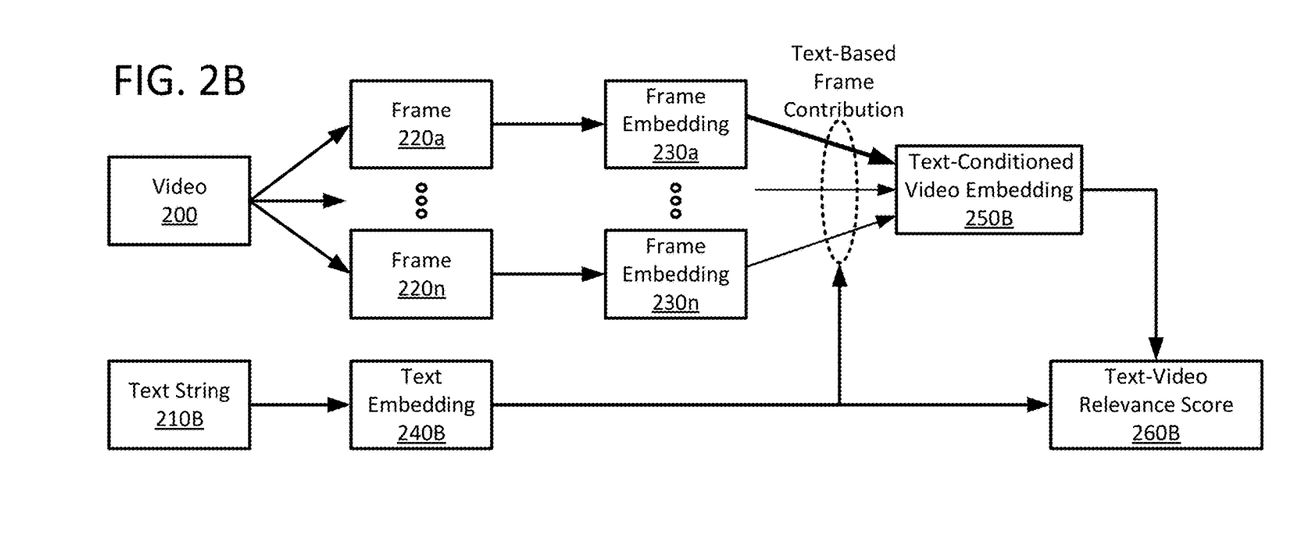

FIGS. 2A-B shows example flows for evaluating a text-video pair to determine a text-video relevance score, according to one embodiment. FIGS. 2A-B show an example of evaluating a relevance score for the same video 200 for two different text strings 210A-B (e.g., texts). In general, to evaluate the relevance score for a text-video pair, the text and video are converted to representations in a joint latent space, such that the positions of the text and video in the latent space may be used to evaluate relevance, e.g., by a distance metric between the text and video representations in the latent space. In some embodiments, the embedding space may not be joint across the text and video, but may generally provide a representation from which the relevance score may be determined and where positions of the text/video in the space(s) may be learned. As such, the embedding space has a number of dimensions D that may be used to represent latent characteristics of the text and video in the latent space, where the video is represented by a text-conditioned video embedding 250 ($z_{v|t}$) and the text is represented by a text embedding 240 ($z_t$). As such, the text embedding 240 and the text-conditioned video embedding 250 in one embodiment specify values across each of the D dimensions to represent the corresponding text and video in a text-video pair for evaluation:

$$z_{v|t} \in \mathbb{R}^D$$

$$z_t \in \mathbb{R}^D$$

These embeddings may also be described as a latent vector where the vector describes a sequence of positions corresponding to each dimension and assigned a value designating the "position" in that position for the respective object (e.g., text, video, or frame). Because videos may often include portions or subregions (e.g., individual frames 220) that depict significantly different types of content, the embedding constructed for the video is a text-conditioned embedding that is a function of (and accounts for) the particular text for which the relevance score is evaluated, such that the text-conditioned video embedding 250 focuses its representation on the frames most relevant to the text. In this sense, the video embedding may be considered to include an attention mechanism that attends to individual frames based on the input text.

To do so, a frame embedding 230a-n is generated for each of the constituent frames 220a-n of the video 200 and a text embedding 240 is generated from the input text string 210. In some embodiments, rather than using all frames of the video, a subset of frames are sampled from the video (e.g., one frame each half-second of video, each $10^{th}$ frame, etc.). The frame and text embeddings may be generated by a respective frame embedding model $\Phi$ and text embedding model $\psi$. The frame and text embedding models may be trained based on a text-image model that learns parameters to evaluate relevance of texts to images. In one embodiment, the frame and text embedding models may be structured models that learn parameters for the text embedding model and image embedding model, such as CLIP (Contrastive Language-Image Pre-training), ALIGN (A Large-scale ImaGe and Noisy-Text Embedding), DeCLIP (Data Efficient CLIP), ALBEF (ALign the image and text representations BEfore Fusing) and similar models that reason between language and images. Such models may be trained to generate representations of texts and images in the joint space based on a training set of labeled images. That is, these models may provide for learning the joint latent space (and parameters for related text and image embeddings) relating texts to individual images. Formally, the output of the text embedding model is designated a text embedding $c_t$ and the output of the frame (image) embedding model is for a particular frame f of a video v is designated $c_v^f$. As such, the text embedding 240 and frame embedding 230 (for a given video's frame) may be defined by Equations 1 and 2:

$$c_t = \psi(t) \quad \text{Equation 1}$$

$$c_v^f = \Phi(v^f) \quad \text{Equation 2}$$

As shown in Eq. 1, the text embedding $c_t$ may be given by the text embedding model $\psi$ applied to a text t, and in Eq. 2, the frame embedding for a frame of video $c_v^f$ may be defined by the frame embedding model $\Phi$ applied to a video frame $v^f$.

Figure 3:
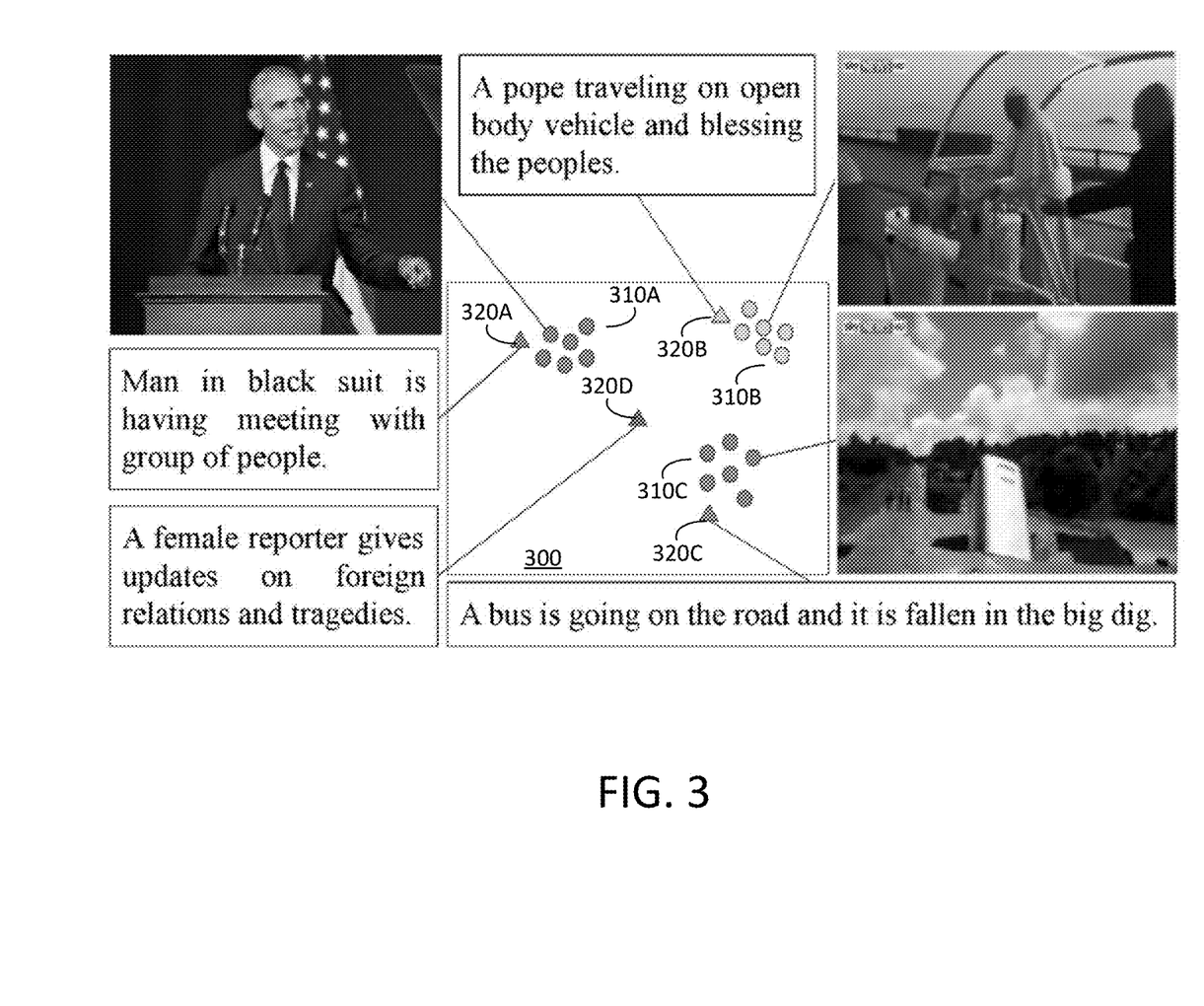
FIG. 3 shows an example projection of embeddings for frames of a video and related texts, according to one embodiment.

FIG. 3 shows an example projection of embeddings for frames of a video and related texts, according to one embodiment. The example in FIG. 3 shows a projection of an embedding space 300 (projected to a two-dimensional plane) in which text embeddings and frame embeddings may be projected. This example shows a single example video in a training data set (here, the MSR-VTT dataset). The video includes several different scenes that may be most semantically similar to different subregions of the video, represented as a subset of frames. Depending on the given text, the frames that are the most semantically similar would differ, so multiple equally valid texts can match a particular video. The frames depict various scenes from international news and express different visual content. Multiple captions associated with this video may best match a different video frame (or region of frames) but can seem irrelevant to others. In this example, the same video should be retrieved for any of these queries, even though the relevant content is limited to sub-regions of the video.

The projection 300 of the embedding space illustrates this point. The frames of the video are shown (in the projection 300) as frame embeddings 310 and the text embedding 320 are labeled with different texts (e.g., captions). As shown in FIG. 3, the frame embeddings 310 may generally be projected to different areas of the projection 300, such that the frame embedding 310A, 320B, and 320C are each in different portions of the projection. Each region of frame embedding may thus be "close" to a respective text embedding 320A-320C (reflecting that the text-frame similarity is effectively captured in the latent space), but an embedding for the video as a whole (text embedding 320D) may overly generalize the frame embeddings and fail to capture the similarity of regions of video frames to individual texts. As such, pooling the frame embeddings conditioned on the text to generate the video embedding, the text-conditioned video embedding evaluated for text corresponding to text embedding 320A, may emphasize the similar frame embeddings near frame embedding 310A and de-emphasize dissimilar frames such as those associated with frame embeddings 310B-C. This may yield a representation of the video as a whole for relevance scoring that permits improved responsiveness, particularly when regions of the video are dissimilar.

Returning to FIG. 2A-B, the text-conditioned video embedding 250 thus accounts for a text-based frame contribution, such that the text-conditioned video embedding 250 accounts for the particular text for a text-video pair. As shown in FIG. 2A-2B, when different text strings 210A-B are input, different text embeddings 240A-B are generated, which may modify the text-based frame contribution and yield different text-conditioned video embeddings 250A-B. As such, when evaluating the relevance of text string 210A to video 200, the text-conditioned video embedding 250A (focusing on frames relevant to text string 210A) may be scored with the text embedding 240A to yield text-video relevance score 260A for the text-video pair of video 200 and text-string 210A. Likewise for text string 210B, the same video 200 is affected by a different text-based frame contribution, yielding a different text-conditioned video embedding 250B for scoring with text embedding 240B to yield text-video relevance score 260B for the text-video pair of video 200 and text string 210B.

The text-video relevance score 260 may be generated by any suitable relevance scoring function. In some embodiments, the scoring function is a distance metric in the latent space (e.g., measuring the distance between the text embedding 240 and text-conditioned video embedding 250). The scoring function may be based on a cosine similarity function. The scoring function may also include trainable parameters determined during training of the model.

The text-based frame contribution may be determined from the frame embeddings 230a-n in various ways in different embodiments. For convenience, the set of frame embeddings for a video v having F frames sequenced over time T may be described as $C_v$:

$$C_v = [C_v^1, C_v^2, \ldots, C_v^F]^T \in \mathbb{R}^{F \times D}$$

The text embedding ($z_t$) used for the text-video relevance score 260 may be the same as the output of the text embedding model (i.e., $z_t = c_t$) while the text-conditioned video embedding 250A ($z_{v|t}$) is a function of the constituent video frame embeddings $c_v$ and may be aggregated according to an aggregation function $\pi$ based on the video frame embeddings and the text t: ($z_{v|t} = \pi(c_v|t)$).

In one embodiment, the video embedding may be determined based on the application of the text embedding 240 to each frame embedding 230 to determine a similarity (e.g., based on a distance metric) of the text to each individual frame and used as the aggregation function $\pi$. In this example, the contribution for each frame in the aggregation function may then be determined as a function of the score for the text to the frame.

As discussed above, the relevance score may be determined based on a distance metric, and in one embodiment the relevance score for a text-video pair (i.e., scoring function (s(t,v))) may be determined by the cosine similarity of the text embedding $z_t$ and text-conditioned video embedding $z_{v|t}$:

$$s(t, v) = \frac{z_t \cdot z_{v|t}}{\|z_t\| \|z_{v|t}\|} \qquad \text{Equation 3}$$

In another embodiment, the text-conditioned video embedding $z_{v|t}$ may be determined based on an aggregation function that combines a number of frames that are most similar to the input text. In one embodiment, the number of frames is defined by k, and this approach may combine the frame embeddings of the "top-k" most similar frames for an aggregation function $\pi_{top-k}$, in one example according to:

$$\pi_{top-k}(C_v|t) = \frac{1}{k} \sum_{f \in \mathcal{K}} c_v^f$$

In this example, the embeddings of the "top-k" most similar video frames may be combined, either as an average or as a weighted average based on the similarity of the frames to the text, as measured by a cosine similarity of the text embedding $c_t$ and the respective frame embeddings $c_v^f$. Formally, the set of K frames may be selected according to:

$$\mathcal{K} = \underset{\substack{\mathcal{K} \subseteq \{1, \ldots, F\} \\ |\mathcal{K}| = k}}{\arg\max} \sum_{f \in \mathcal{K}} \frac{c_t \cdot c_v^f}{\|c_t\| \|c_v^f\|}$$

such that the similarity between the frames and the text is used to select the highest-scoring (top-K) frames used for determining the text-conditioned video embedding.

Figure 4:
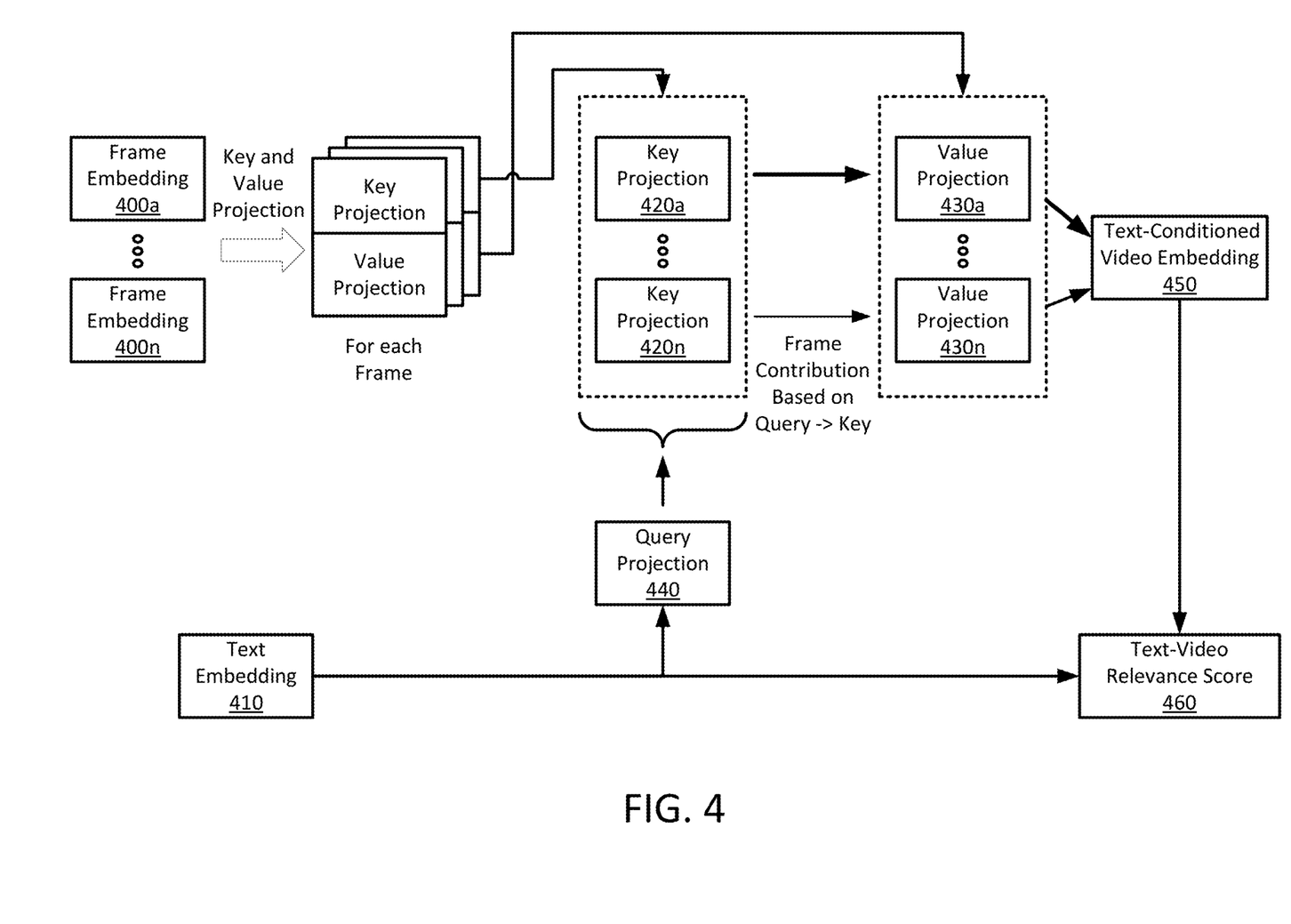
FIG. 4 shows an example data flow for a text-conditioned video embedding determined with query-key-value projections, according to one embodiment.

FIG. 4 shows an example data flow for a text-conditioned video embedding determined with query-key-value projections, according to one embodiment. For convenience, the example of FIG. 4 shows the frame embeddings 400a-n and text embedding 410 of a text-video pair, for example as may be output by a frame embedding model and text embedding model discussed above and with respect to FIGS. 2A-B. In this example, rather than directly measure distance between the text embedding and the frame embeddings (e.g., as with the "top-k" embodiment), the frame embeddings 400a-n are projected to respective key and value projections, forming a set of key projections 420a-n and value projections 430a-n. The projections may be in a different dimensionality than the latent space of the embeddings and may have a number of projection dimensions designated $D_p$. To apply the text embedding 410 to the projection space, the text embedding 410 may similarly be projected to a query projection 440. The key projections may thus represent each of the frames as a "look-up" to determine respective weights based on the query projection. These weights may be considered to provide attention weights to the respective associated value projections of the frames. The query projection 440 thus applied to the key projections 420 may indicate the respective frame contribution for the value projections 430a-n of the frames. The value projections 430a-n may then be combined based on the respective frame contributions/attention weights and converted back to the embedding space (i.e., having dimensionality D) as the text-conditioned video embedding 450. The text-conditioned video embedding 450 may then be scored with respect to the text embedding 410 (e.g., via a distance metric such as a cosine similarity) to generate the text-video relevance score 460 of the text-video pair.

In further detail, the embeddings may be converted to the respective projections with respective projection matrices $W_K$, $W_V$, $W_Q$ of dimensions $D \times D_p$. The respective projections and embeddings are also designated as:

Key Projection Matrix $W_K$
Key Projection 420: $K_v \in \mathbb{R}^{F \times D_p}$
Value Projection Matrix $W_V$
Value Projection 430: $V_v \in \mathbb{R}^{F \times D_p}$
Query Projection Matrix $W_Q$
Query Projection 440: $Q_t \in \mathbb{R}^{1 \times D_p}$ In some embodiments, in addition to applying the projection matrices directly, the respective projections may also include a layer normalization (LN) in one embodiment to normalize the output of the projection, as follows:

$$Q_t = LN(c_t^T) W_Q$$

$$K_v = LN(C_v) W_K$$

$$V_v = LN(C_v) W_V$$

As one embodiment for applying the projections to generate the text-conditioned video embedding 450, the projections may be combined as an attention function for the value projections, which in one embodiment may include a softmax layer to normalize the resulting value projection:

$$\text{Attention}(Q_t, K_v, V_v) = \text{softmax}\left(\frac{Q_t K_t^T}{\sqrt{D_p}}\right) V_v \qquad \text{Equation 4}$$

The resulting value matrix may be in the projection dimensionality $D_p$, such that to determine the text-conditioned video embedding 450, an additional conversion matrix $W_O$ may be applied to the attention result to yield a representation in the embedding space having dimensionality D. As such, $W_O$ may have dimensionality $D_p \times D$. As such, a text-conditioned embedding $r_{v|t}$ may be determined by applying $W_O$ to the attention function in the projection space, and in one embodiment may include a layer normalization, as shown in Equation 5:

$$r_{v|t} = LN(\text{Attention}(Q_t, K_v, V_v) W_O) \qquad \text{Equation 5}$$

As shown in Eq. 5, this may provide a scaled dot product attention to give relevancy weights from the text to each frame, and then used to aggregate the value-projected frame embeddings. In one embodiment, the text-conditioned video embedding $r_{v|t}$ may be used as the text-conditioned video embedding 450 used for evaluation with the text embedding 410 for determining the text-video relevance score 460.

In a further embodiment, the text-conditioned video embedding $r_{v|t}$ may be further processed by additional layers before use as the final text-conditioned video embedding 450 (also termed $z_{v|t}$). In one embodiment, this further processing may include a fully-connected layer (FC) and a layer normalization as shown by Equation 6 in which the text-conditioned video embedding is combined with itself after processing by a FC layer:

$$z_{v|t} = \pi_{Pool}(C_v|t) = LN(FC(r_{v|t}) + r_{v|t})^T \qquad \text{Equation 6}$$

As shown in Eq. 6, $\pi_{Pool}$ describes the frame embedding pooling function of this embodiment as a function of the sampled frames of the video and the text. The use of the projection space and addition of the fully-connected layer and residual connection may provide for more complex reasoning by the model for pooling frames of the video to effectively represent the video with respect to the related input text. This model may include various additional parameters for various processes, such as the projection matrices, layer normalizations, fully-connected layers, etc., which may be determined during training of the model.

Figure 5:
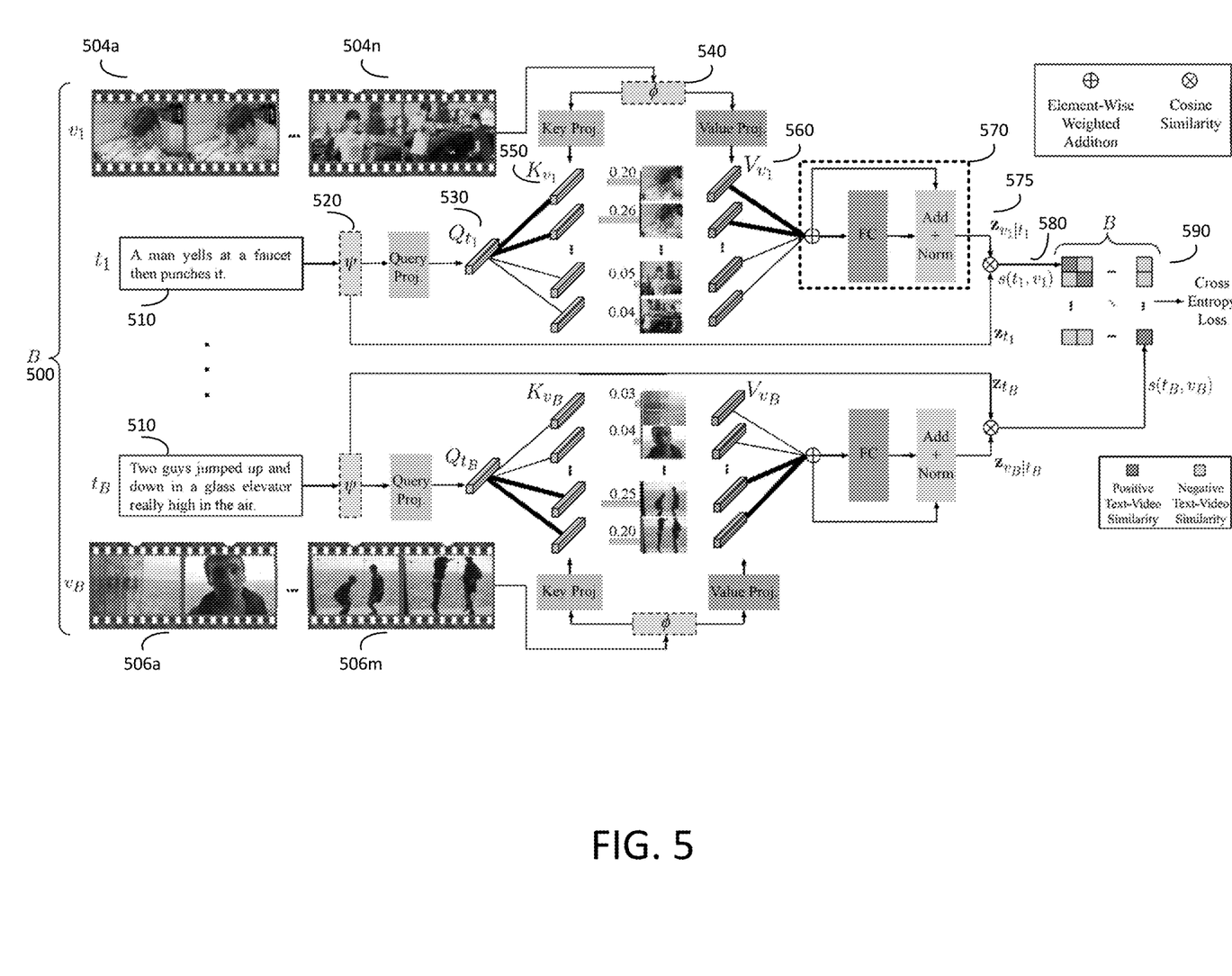
FIG. 5 shows an example flow for training a recommendation model, according to one embodiment.

FIG. 5 shows an example flow for training a recommendation model, according to one embodiment. The model architecture shown in FIG. 5 is an example similar to the embodiment shown in FIG. 4. FIG. 5 shows a training set 500 for B training videos in a training batch, including videos labeled $v_1$-$v_B$ and associated texts 510 labeled $t_1$-$t_B$. In this example, each video v is associated with one training label to be learned by the model, such that video $v_1$ is associated with text $t_1$ and video $v_B$ is associated with text $t_B$. Also in this example, each video may include a different number of frames (which may be sampled from the video); in this example a first video $v_1$ has frames 504a-n and a second video $v_B$ has frames 506a-m. In additional embodiments, the frames of the video may be sampled such that the number of frames input to the recommendation model are constant.

In general, to train parameters of the model, the recommendation model is applied to text-video pairs constructed from the training batch to form a training result matrix 590 that reflects the evaluation of a relevance score for each of the texts $t_1$-$t_B$ as applied to each of the videos, yielding a respective text-conditioned video embedding $z_{v|t}$ for evaluating the video in each text-video pair to yield the respective text-video relevance score in the training result matrix 590. In this example, as each video is associated with one label, there are B videos and B texts, such that the training result matrix 590 is of the dimensions B×B. In other embodiments, e.g., in which the same video may be labeled with multiple texts, the training result matrix 590 may have additional entries to account for the additional texts.

As discussed above with respect to FIG. 4, in this example the recommendation score for a text-video pair (here used in training the model) is generated by determining a text embedding with a text embedding model 520 and a set of frame embeddings with a video embedding model 540. The text and video embeddings may then be projected to the query, key, and value projections as discussed above, yielding a query projection 530, key projections 550, and value projection 560. By applying the attention mechanism discussed above and additional processing layers 570 as discussed above with respect to Eqs. 4-6, a text-conditioned video embedding 575 is generated for each text-video pair. A scoring function s(t,v), such as shown in Eq. 3 may then be applied to generate the text-video relevance score for the text-video pair and populate the respective position in the result matrix 590. Each combination of text and video may be applied to the model in this way, e.g., to generate respective entries t×v entries in the result matrix 590.

The parameters of the recommendation model may then be updated (i.e., trained) to improve an objective or reduce a loss function for the model. The model outputs may be labeled with the known labels of the text-video associations in the training batch such that the text associated with a video is a positive label and other texts are a negative label for the text-video pair in the training data. For example, a text-video pair of a first video and its associated text in the training data $v_1$-$t_1$ is labeled as a positive training instance, while the text-video pairs of the first video and other texts is labeled as negative training instances in the training matrix 590. The training objective/loss function may thus aim to learn/update model parameters that maximize the relevance score of the positive examples and minimize relevance scores of the negative examples. The parameters of the model that may be learned in one embodiment may include the projection matrices, normalization layers, fully connected layers, and so forth. In varying embodiments, the text embedding model 520 and frame embedding model 540 may also have parameters modified in training (e.g., fine-tuned to the recommendation model), and in others these parameters are not modified in the recommendation model training process.

Any suitable training process may be applied to train parameters based on the training result matrix 590 and in various embodiments may be performed by a model training module 120. In one embodiment, the training process applies a cross-entropy loss. In some embodiments, as the model may be designed to learn both text-to-video and video-to-text lookup, the loss function may include components for assessing each loss. As such, a loss function $\mathcal{L}_{t2v}$ for text-to-video and corresponding loss for video-to-text $\mathcal{L}_{v2t}$ as cross-entropy losses may be determined respectively by:

$$\mathcal{L}_{t2v} = -\frac{1}{B}\sum_{i=1}^{B}\log\frac{e^{s(t_i,v_i)\lambda}}{\sum_{j=1}^{B}e^{s(t_i,v_j)\lambda}}$$

$$\mathcal{L}_{v2t} = -\frac{1}{B}\sum_{i=1}^{B}\log\frac{e^{s(t_i,v_i)\lambda}}{\sum_{j=1}^{B}e^{s(t_i,v_j)\lambda}}$$

A total loss function $\mathcal{L}$ in some embodiments may be the combination of these losses:

$$\mathcal{L} = \mathcal{L}_{t2v} + \mathcal{L}_{v2t}$$

While other loss functions may be used, this loss function applies a symmetric loss across both video and text retrieval applications. In this example, $s(t_i,v_i)$ is a cosine similarity between the text embedding and text-conditioned video embedding, B is the batch size and $\lambda$ is a learnable scaling parameter. As such, the overall recommendation model may use the text and image embedding models for learning text-conditioned representations of the video, permitting the representation of the video to attend to relevant frames in the video in evaluating the relevance of a text to the video, increasing the likelihood that relevant text-video relevance will account for relevant portions of a video with respect to different texts.

Experimental Results

Experiments were performed with various embodiments and are discussed here on common benchmark text-video retrieval datasets of MSR-VTT, MSVD and LSMDC.

MSR-VTT is comprised of 10,000 videos, each paired with about 20 human-labeled captions. The multiple captions for each video in MSR-VTT often describe different video sub-regions. The lengths of videos in this dataset range from 10 to 32 seconds, and these experiments use two training splits, termed 7 k-Train and 9 k-Train to effectively compare with previous works. 7 k-Train is a subset of roughly 7 k videos, while 9 k-Train consists of approximately 9 k videos. Unless otherwise stated, the 9 k-Train split was for training. To evaluate these recommendation models, a data set of 1,000 selected caption-video pairs was used.

MSVD contains about 120 k captions that each describe one of 1,970 videos ranging in length from 1 to 62 seconds. Again, videos are paired with multiple captions and each may describe different sub-regions of the same video. In MSVD, the training, validation and test splits are comprised of 1,200, 100 and 670 videos, respectively. The results presented here are evaluated on the test split that has a varying number of captions per video. Here, all of the provided caption-video pairs as separate instances for evaluation.

LSMDC is a movie clip dataset containing 118,081 videos each paired with a single caption description. The lengths of videos range from 2 to 30 seconds. 101,079 videos were used for training while 7,408 and 1,000 videos are used for validation and testing, respectively. An embodiment using the query, key, and value projections and trained as discussed with respect to FIG. 5 was used and compared with other text-video relevance models; this embodiment is referred to as X-Pool in the results below.

In these experiments, the frame embedding model is the CLIP ViT-B/32 image encoder and the text embedding model is CLIP's transformer base text encoder and initialize all encoder parameters from CLIP's pre-trained weights. In these experiments, the query, key and value projection dimension size $D_p=512$ and match CLIP's output dimension (i.e., $D_p=D$). In these examples, the fully-connected layer includes a linear layer with D outputs for the D video embedding output and include a dropout of 0.3. The projection weight matrices were initialized with an identity matrix and biases at zero. As such, the model in this experiment bootstraps from the text-image reasoning of pre-trained CLIP models. In this example, the model is fine-tuned end-to-end on each dataset, such that parameters of the text embedding model and frame embedding model may be further revised during training. The batch size B was 32 for all experiments and set the learning rate for CLIP-initialized weights to $1e^{-6}$, and for all other parameters to $1e^{-5}$. The model was optimized for 5 epochs using the AdamW optimizer with a weight decay set to 0.2 and decay the learning rate using a cosine schedule. In these experiments, 12 frames are uniformly sampled from every video and each frame was resized to 224×224.

To evaluate the X-Pool embodiment, its performance is compared with other models. As shown by the results below, this approach significantly improves metrics relative to prior approaches, including Recall (R@1, R@5, R@10), Median Rank (MdR) and Mean Rank (MnR).

TABLE 1

| Methods | R@1↑ | R@5↑ | R@10↑ | MdR↓ | MnR↓ |
|---|---|---|---|---|---|
| CE | 20.9 | 48.8 | 62.4 | 6.0 | 28.2 |
| MMT | 26.6 | 57.1 | 69.6 | 4.0 | 24.0 |
| Straight-CLIP | 31.2 | 53.7 | 64.2 | 4.0 | — |
| Support Set | 30.1 | 58.5 | 69.3 | 3.0 | — |
| MDMMT | 38.9 | 69.0 | 79.7 | 2.0 | 16.5 |
| Frozen | 31.0 | 59.5 | 70.5 | 3.0 | — |
| TeachText-CE+ | 29.6 | 61.6 | 74.2 | 3.0 | — |
| CLIP4Clip-meanP | 43.1 | 70.4 | 80.8 | 2.0 | 16.2 |
| CLIP4Clip-seqTransf | 44.5 | 71.4 | 81.6 | 2.0 | 15.3 |
| X-Pool | 46.9 | 72.8 | 82.2 | 2.0 | 14.3 |

TABLE 2

| Methods | R@1↑ | R@5↑ | R@10↑ | MdR↓ | MnR↓ |
|---|---|---|---|---|---|
| HowTo100M | 14.9 | 40.2 | 52.8 | 9.0 | — |
| ActBERT | 8.6 | 23.4 | 33.1 | 36.0 | — |
| NoiseE | 17.4 | 41.6 | 53.6 | 8.0 | — |
| ClipBERT | 22.0 | 46.8 | 59.9 | 6.0 | — |
| CLIP4Clip-meanP | 42.1 | 71.9 | 81.4 | 2.0 | 15.7 |
| CLIP4Clip-seqTransf | 42.0 | 68.6 | 78.7 | 2.0 | 16.2 |
| X-Pool | 43.9 | 72.5 | 82.3 | 2.0 | 14.6 |

TABLE 3

| Methods | R@1↑ | R@5↑ | R@10↑ | MdR↓ | MnR↓ |
|---|---|---|---|---|---|
| CE | 19.8 | 49.0 | 63.8 | 6.0 | 23.1 |
| Support Set | 28.4 | 60.0 | 72.9 | 4.0 | — |
| NoiseE | 20.3 | 49.0 | 63.3 | 6.0 | — |
| Straight-CLIP | 37.0 | 64.1 | 73.8 | 3.0 | — |
| Frozen | 33.7 | 64.7 | 76.3 | 3.0 | — |
| TeachText-CE+ | 25.4 | 56.9 | 71.3 | 4.0 | — |
| CLIP4Clip-meanP | 46.2 | 76.1 | 84.6 | 2.0 | 10.0 |
| CLIP4Clip-seqTransf | 45.2 | 75.5 | 84.3 | 2.0 | 10.3 |
| X-Pool | 47.2 | 77.4 | 86.0 | 2.0 | 9.3 |

TABLE 4

| Methods | R@1↑ | R@5↑ | R@10↑ | MdR↓ | MnR↓ |
|---|---|---|---|---|---|
| CE | 11.2 | 26.9 | 34.8 | 25.3 | — |
| MMT | 12.9 | 29.9 | 40.1 | 19.3 | 75.0 |
| NoiseE | 6.4 | 19.8 | 28.4 | 39.0 | — |
| Straight-CLIP | 11.3 | 22.7 | 29.2 | 56.5 | — |
| MDMMT | 18.8 | 38.5 | 47.9 | 12.3 | 58.0 |
| Frozen | 15.0 | 30.8 | 39.8 | 20.0 | — |
| TeachText-CE+ | 17.2 | 36.5 | 46.3 | 13.7 | — |
| CLIP4Clip-meanP | 20.7 | 38.9 | 47.2 | 13.0 | 65.3 |
| CLIP4Clip-seqTransf | 22.6 | 41.0 | 49.1 | 11.0 | 61.0 |
| X-Pool | 25.2 | 43.7 | 53.5 | 8.0 | 53.2 |

As shown in Tables 1-4, the X-Pool embodiment performs well against these prior approaches that do not condition video representation on the input text. The t2v retrieval performance of the model trained on the MSRVTT 9 k-Train and 7 k-Train splits is shown in Table 1 and Table 2, respectively. Tables 3 and 4 similarly compare the performance of X-Pool on the MSVD and LSMDC datasets, respectively. Note that on all datasets and across all metrics, the text-conditioned X-Pool model outperforms all other works that use text-agnostic pooling. Most notably, our model outperforms previous state-of-the-art methods CLIP4Clip-meanP and CLIP4Clip-seqTransf. As these also used CLIP as a backbone, the improved results of X-Pool are directly attributable to the text-conditioned pooling compared to the text-agnostic pooling schemes of CLIP4Clip-meanP and CLIP4Clip-seqTransf.

More precisely, on the MSR-VTT dataset, there is a relative improvement of 5% in Recall@1 compared to CLIP4Clip-seqTransf. For the MSVD dataset, the X-Pool embodiment outperforms CLIP4Clip-meanP by over 2% in relative improvement in Recall@1. In the case of the LSMDC dataset, the retrieval problem is more challenging since the movie scene text descriptions are much more ambiguous, which can be observed by the overall lower retrieval scores of all previous methods. Yet, X-Pool notably outperforms CLIP4ClipseqTransf by 12% in relative improvement in Recall@ 1. These results thereby highlight the importance of text-conditioned aggregation that can learn to match a text with its most relevant frames while suppressing distracting visual cues from other video sub-regions.

In addition, the top-k embodiment (e.g., as discussed with respect to FIG. 2 and $\pi_{top-k}$) was also evaluated against other mean-pooling models as a baseline across two settings: first with a pretrained CLIP model in a zero-shot manner to compare mean-pooling and top-k aggregation, and second with fine-tuning of a pre-trained CLIP model on the MSRVTT dataset, and then comparing retrieval performance for mean-pooling and top-k pooling on the fine-tuned CLIP model. In both settings, k was set to 3, which empirically yielded the best overall performance. We compare the t2v results in Table 5 below:

TABLE 5

| Aggr. | R@1↑ | R@5↑ | R@10↑ | MdR↓ | MnR↓ |
|---|---|---|---|---|---|
| Zero-Shot CLIP | | | | | |
| Mean | 31.5 | 52.8 | 63.6 | 5.0 | 42.9 |
| Top-k | 33.6 | 54.0 | 64.3 | 4.0 | 42.5 |
| Fine-Tuned CLIP | | | | | |
| Mean | 42.1 | 69.8 | 80.7 | 2.0 | 15.7 |
| Top-k | 44.6 | 70.9 | 82.4 | 2.0 | 14.9 |

Table 5 shows that even by using cosine similarity in top-k pooling as a proxy for semantic similarity between a text and frames, the model outperforms mean-pooling across all listed metrics by up to 6% of relative improvement in Recall@1.

Figure 6:
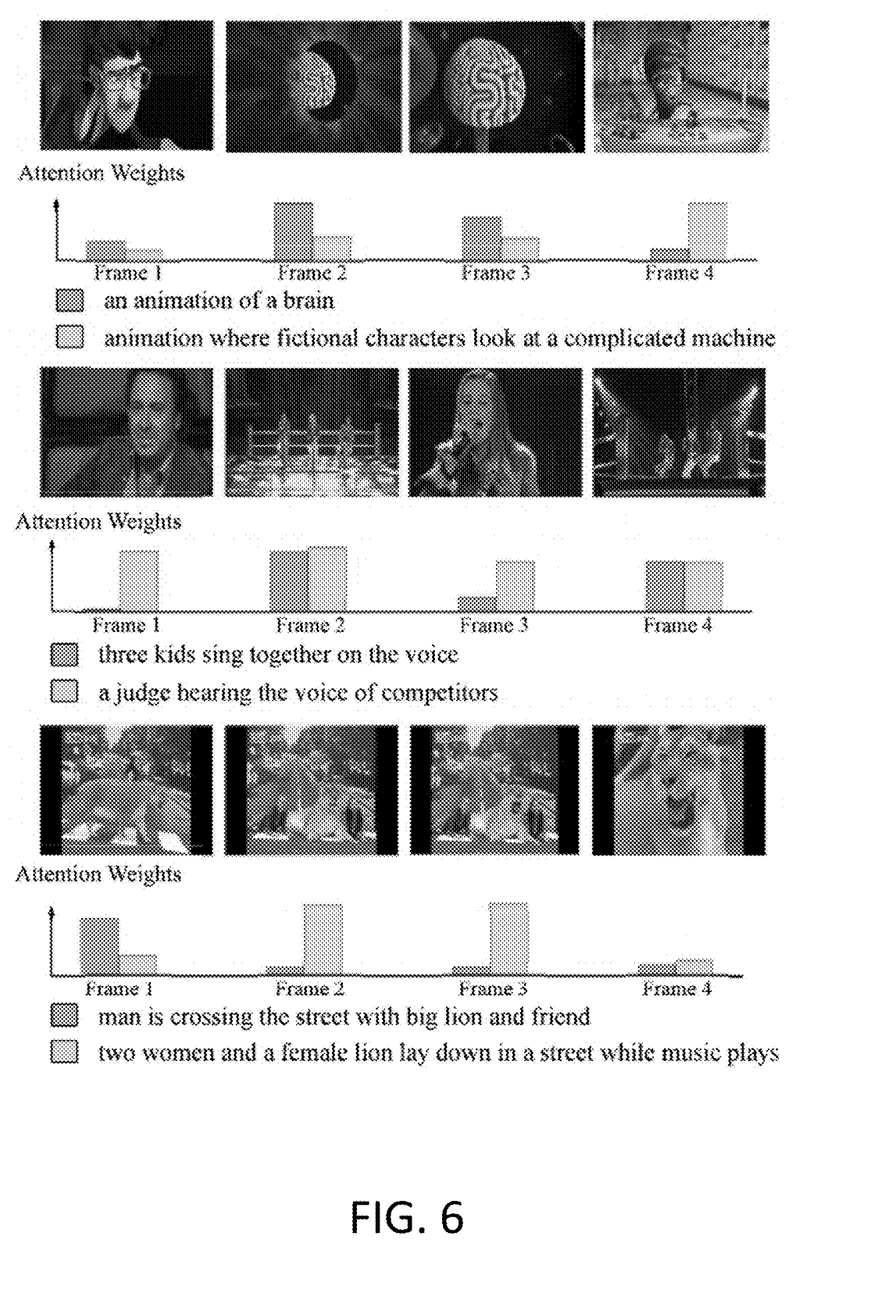
FIG. 6 shows a qualitative example of attention weights in forming a text-conditioned video embedding, according to one embodiment The figures depict various embodiments of the present invention for purposes of illustration only. One skilled in the art will readily recognize from the following discussion that alternative embodiments of the structures and methods illustrated herein may be employed without departing from the principles of the invention described herein.

FIG. 6 shows a qualitative example of attention weights in forming a text-conditioned video embedding, according to one embodiment. FIG. 6 shows four sampled frames from a video along with a bar plot representing the associated attention weights of the X-Pool embodiment from the given text to each frame. In the top example, the X-Pool model outputs a higher attention weight for the middle frames when the input text describes a brain animation and lower attention weights everywhere else. On the other hand, when the input text instead describes a fictional character looking at a machine, the attention weight correspondingly activates for the last frame where the text is most relevant. The second example in the middle shows a singing competition. Here, the text of "a judge hearing the voice of competitors" describes an event that requires reasoning over all of the frames. Indeed, X-Pool attends to the entire video, indicating the flexibility of this approach—focusing on more or fewer frames as appropriate for the text. Finally, the last example in FIG. 6 shows the different attention weights for a video with a lion, illustrating different attention weights for a video including a lion according to the different context in the different text descriptions.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for evaluating relevance of a text string to a video comprising:
   a processor; and
   a non-transitory computer-readable medium having instructions executable by the processor for:
   identifying a text embedding of the text string;
   identifying a plurality of frame embeddings associated with a plurality of frames of the video;
   evaluating the text embedding with respect to each frame embedding of the plurality of frame embeddings;
   selecting a set of highest-relevance frames based on the evaluating;
   generating a text-conditioned video embedding for the video by combining the plurality of frame embeddings associated with the set of highest-relevance frames without contribution of the frame embeddings not associated with the set of highest-relevance frames; and
   determining a relevance score of the text string to the video based on the text-conditioned video embedding and the text embedding.

2. The system of claim 1, the instructions further executable for selecting the video as responsive to a text query including the text string based on the relevance score.

3. The system of claim 1, wherein the relevance score is based on the cosine similarity of the text-conditioned video embedding with respect to the text embedding.

4. The system of claim 1, wherein combining the plurality of frame embeddings is based on a weight for each of the plurality of frame embeddings, wherein the weight for a frame is determined based on the respective frame embedding and the text embedding.

5. The system of claim 1, wherein determining the text-dependent video embedding includes:
   projecting the text embedding to a query projection;
   projecting the plurality of frame embeddings to a key matrix including a key projection for each frame and a value matrix including a value projection for each frame; and
   determining a combined value projection by combining the value projections of the value matrix based on the respective key projection for a respective frame of the key matrix applied to the query projection.

6. The system of claim 5, wherein determining the text-dependent video embedding further comprises projecting the weighed value matrix to a dimensionality of the text embedding.

7. The system of claim 1, wherein combining the respective frame embeddings exclusively of the set of highest-relevance frames with contribution of the respective frames further comprises combining the frame embeddings of the highest-relevance frames as a weighted average.

8. A method for predicting relevance of a text string to a video having a plurality of frames, the method comprising:
   identifying a text embedding of the text string;
   identifying a plurality of frame embeddings associated with a plurality of frames of the video;
   evaluating the text embedding with respect to each frame embedding of the plurality of frame embeddings;
   selecting a set of highest-relevance frames based on the evaluating;
   generating a text-conditioned video embedding for the video by combining the plurality of frame embeddings associated with the set of highest-relevance frames without contribution of the frame embeddings not associated with the set of highest-relevance frames respective; and
   determining a relevance score of the text string to the video based on the text-dependent video embedding and the text embedding.

9. The method of claim 8, further comprising selecting the video as responsive to a text query including the text string based on the relevance score.

10. The method of claim 8, wherein the relevance score is based on the cosine similarity of the text-conditioned video embedding with respect to the text embedding.

11. The method of claim 8, wherein combining the plurality of frame embeddings is based on a weight for each of the plurality of frame embeddings, wherein the weight for a frame is determined based on the respective frame embedding and the text embedding.

12. The method of claim 8, wherein determining the text-dependent video embedding includes:
   projecting the text embedding to a query projection;
   projecting the plurality of frame embeddings to a key matrix including a key projection for each frame and a value matrix including a value projection for each frame; and
   determining a combined value projection by combining the value projections of the value matrix based on the respective key projection for a respective frame of the key matrix applied to the query projection.

13. The method of claim 12, wherein determining the text-dependent video embedding further comprises projecting the weighed value matrix to a dimensionality of the text embedding.

14. The method of claim 8, wherein combining the respective frame embeddings exclusively of the set of highest-relevance frames with contribution of the respective frames further comprises combining the frame embeddings of the highest-relevance frames as a weighted average.

15. A non-transitory computer-readable medium for predicting relevance of a text string to a video having a plurality of frames, the non-transitory computer-readable medium comprising instructions executable by a processor for:
   identifying a text embedding of the text string;
   identifying a plurality of frame embeddings associated with a plurality of frames of the video;
   evaluating the text embedding with respect to each frame embedding of the plurality of frame embeddings;
   selecting a set of highest-relevance frames based on the evaluating;
   generating a text-conditioned video embedding for the video by combining the plurality of frame embeddings associated with the set of highest-relevance frames without contribution of the frame embeddings not associated with the set of highest-relevance frames; and determining a relevance score of the text string to the video based on the text-conditioned video embedding and the text embedding.

16. The non-transitory computer-readable medium of claim 15, wherein the instructions are further executable for selecting the video as responsive to a text query including the text string based on the relevance score.

17. The non-transitory computer-readable medium of claim 15, wherein the relevance score is based on the cosine similarity of the text-conditioned video embedding with respect to the text embedding.

18. The non-transitory computer-readable medium of claim 15, wherein combining the plurality of frame embeddings is based on a weight for each of the plurality of frame embeddings, wherein the weight for a frame is determined based on the respective frame embedding and the text embedding.

19. The non-transitory computer-readable medium of claim 15, wherein the instructions for determining the text-dependent video embedding, include instructions for:

projecting the text embedding to a query projection;

projecting the plurality of frame embeddings to a key matrix including a key projection for each frame and a value matrix including a value projection for each frame; and determining a combined value projection by combining the value projections of the value matrix based on the respective key projection for a respective frame of the key matrix applied to the query projection.

20. The non-transitory computer-readable medium of claim 15, wherein combining the respective frame embeddings exclusively of the set of highest-relevance frames with contribution of the respective frames further comprises combining the frame embeddings of the highest-relevance frames as a weighted average.

* * * * *